Aug. 17, 1943.　　A. H. WOLFERZ ET AL　　2,326,909
AMMETER
Filed Feb. 10, 1940　　3 Sheets-Sheet 1

Inventors:
Alfred H. Wolferz,
Paul P. Huber,
By Potter, Pierce & Scheffler,
Attorneys.

Aug. 17, 1943.  A. H. WOLFERZ ET AL  2,326,909
AMMETER
Filed Feb. 10, 1940  3 Sheets-Sheet 2
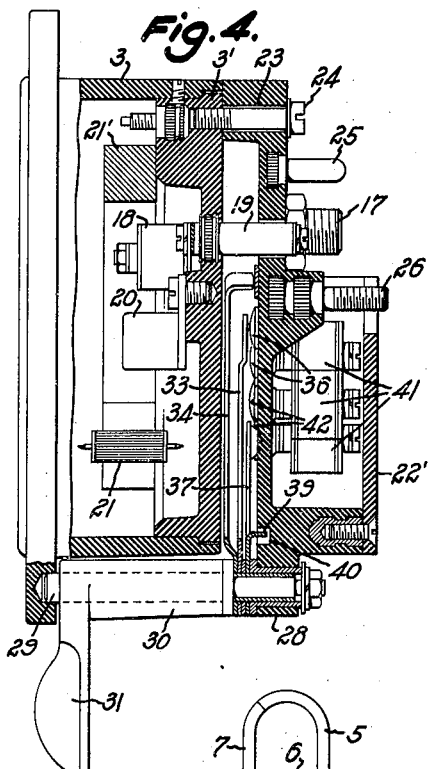
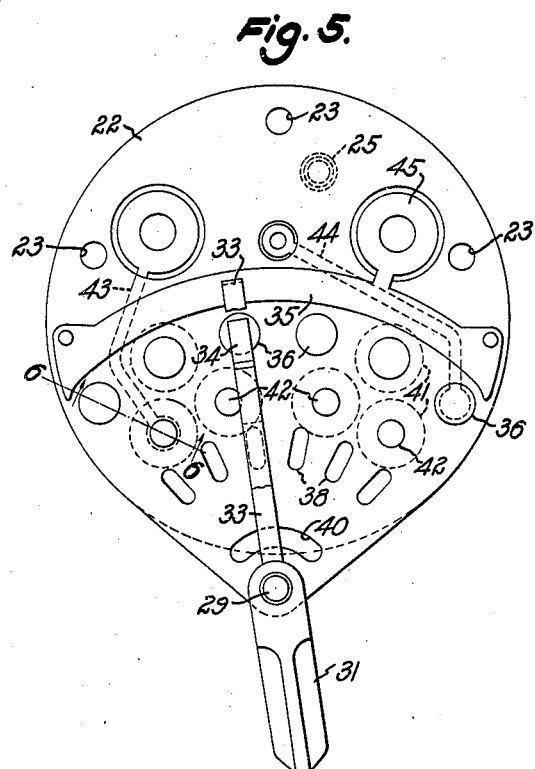
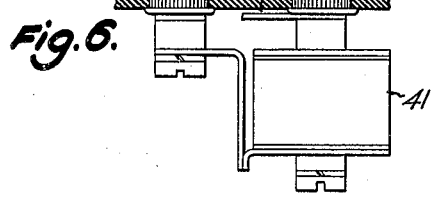
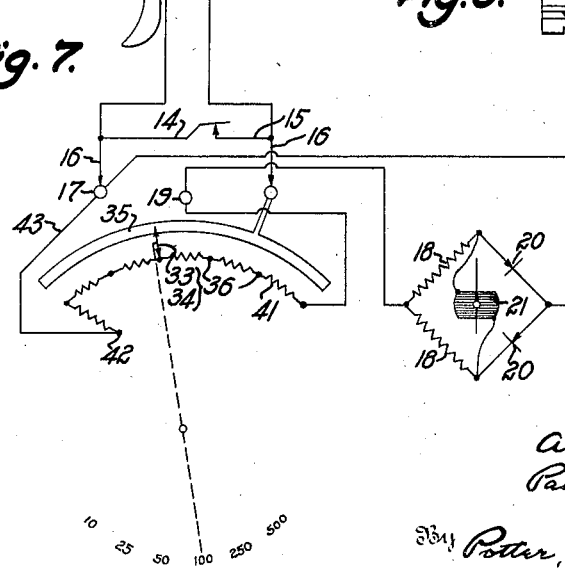
Inventors:
Alfred H. Wolferz,
Paul P. Huber,
By Potter, Pierce & Scheffler,
Attorneys.

Aug. 17, 1943.     A. H. WOLFERZ ET AL     2,326,909
AMMETER
Filed Feb. 10, 1940     3 Sheets-Sheet 3
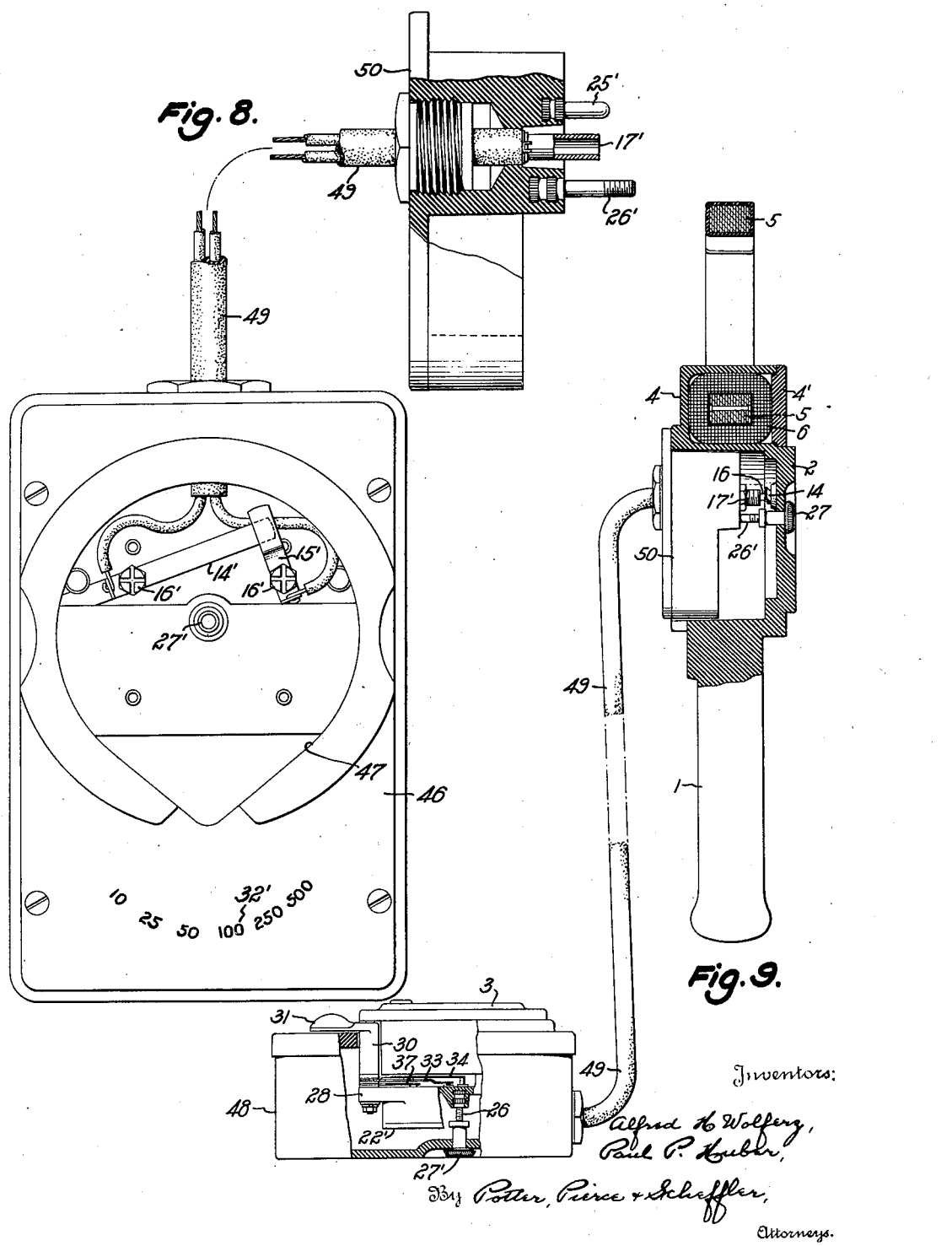

Patented Aug. 17, 1943

2,326,909

UNITED STATES PATENT OFFICE 2,326,909

AMMETER

Alfred H. Wolferz and Paul P. Huber, Hillside, N. J., assignors to Weston Electrical Instrument Corporation, Newark, N. J., a corporation of New Jersey Application February 10, 1940, Serial No. 318,350

15 Claims. (Cl. 171—95)

This invention relates to ammeters and more particularly to clamp-on ammeters such as are used for the measurement of alternating current without cutting the cable or otherwise opening the circuit in which the current is flowing.

An object of the invention is to provide a multi-range clamp-on ammeter having a handle supporting the instrument and the split transformer core, a trigger for opening the core, and range changing switch, the switch operating member and the trigger being positioned for ready actuation with one hand. An object is to provide a clamp-on ammeter including a handle terminating in a socket, a split transformer core and winding carried by the handle, an ammeter detachably mounted in the socket, and cooperating contacts at the socket and on the instrument for completing the measuring circuit when the instrument is secured in the socket. A further object is to provide a clamp-on ammeter incorporating the above features, and an extension unit in the form of a plug and instrument socket coupled by a cable, whereby the plug of the extension unit may be mounted in the socket of the handle and the instrument placed in the socket of the extension unit. Another object is to provide a multi-range clamp-on ammeter in which the instrument and range-changing devices comprise a unitary assembly that may be secured to the handle on which the split transformer is mounted or, alternatively, to the instrument socket of an extension unit that includes a plug for mounting on the handle in place of the instrument.

These and other objects and advantages of the invention will be apparent from the following specification when taken with the accompanying drawings in which Fig. 1 is a front elevation of a multi-range clamp-on ammeter embodying the present invention;

Fig. 4 is an elevation of the instrument and range-changing assembly, with the range-changing unit and switch shown in section;

Fig. 5 is a front elevation of the range-changing unit as seen before mounting on the instrument case;

Fig. 6 is a fragmentary view of certain switch contacts and resistances, on an enlarged scale and in section on line 6—6 of Fig. 5;

Fig. 7 is a schematic diagram of the measuring circuit;

Fig. 8 is a view of the extension unit, the plug being shown in central section and the instrument base or socket in plan; and Fig. 9 is a fragmentary sectional view of apparatus with the extension unit in use.

Figure 3:
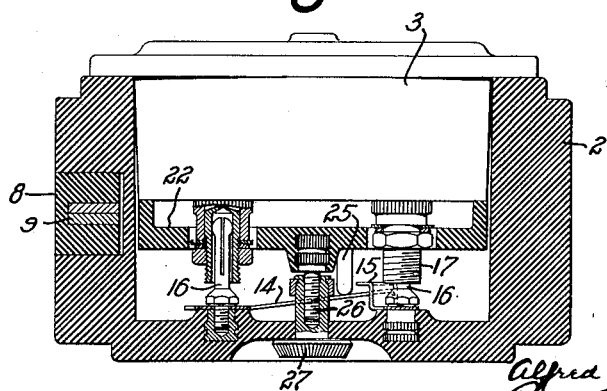
Fig. 3 is a transverse section on line 3—3 of Fig. 2.

In the drawings, the reference numeral 1 identifies the handle portion of a molded body of insulating material that has a central socket or housing section 2 for receiving the case 3 of a measuring instrument and an outer portion 4 which carries the stationary section 5 of the split core and the secondary winding 6 of the transformer. The movable core section 7 is mounted on a lever 8 of insulating material by straps 9 that extend into a groove at the inner face of the lever, see Fig. 3. The lever 8 is pivoted on the central section 2 of the molded body by a pin 10 and is normally retained in closed position within a longitudinal slot at the left side of the molded body by a volute spring 11 that engages the outwardly flaring trigger end 12 of the lever. The handle 1 is of such length that it fits readily within the operator's right hand, and the trigger 12 extends along the upper part of the handle to be encircled by the upper finger or fingers.

The core sections are of the usual laminated construction, and the outline of the core, as seen in elevation, is that of three sides of a square surmounted by a semi-circle. The butt joints of the core are ground for surface engagement and are located at the left end of the lower bar of the core and at the left quadrant of the curved upper section. The off-center location of the upper joint is important as the stationary core section thus forms a hook by which the instrument may be hung upon a cable without introducing stresses that might tend to open the joint. The lower ends of the side bars are set back from the outer edges of the insulating body within slots in the upper section 4, and the upper sections of the core are insulated by a covering 13, preferably rubber tubing that snugly fits the core parts.

The secondary winding 6 is introduced into the top section 4 of insulating material from the rear and is protected by a closure 4', see Fig. 9. The ends of the winding are connected to contact strips 14, 15 on pin terminals 16 that are molded into the rear wall of the instrument socket section, the contact strips being resilient for engagement to short-circuit the winding 6 when the instrument assembly is removed from the socket.

The instrument assembly is removable as a unit from the socket and includes a pair of hollow terminals 17 for engagement with the socket pin terminals 16 when the instrument is placed in the socket. The measuring instrument within the casing 3 may be of any desired design but preferably is of the sensitive direct current milliammeter and rectifier bridge type that is shown diagrammatically in Fig. 7. The resistors 18 of the rectifier bridge are connected to and mounted on a stud 19 that extends through the base 3' of the casing 3, and the two rectifiers of the bridge are within the small housing unit 22 that is mounted on the base 3'. The moving coil 21 of the milliammeter is pivotally supported in the field of the permanent magnet 21' and is connected to the rectifier bridge in the usual manner. The electrical circuit of the instrument is shown in Fig. 7, and the physical structure of the instrument may conform to good design practice.

The range-changing system of the instrument assembly, as shown in Figs. 4 and 5, comprises a base 22 of insulating material having openings 23 for receiving screws 24 for securing the base 22 to the base 3' of the milliammeter. The base 22 has other openings for passing the terminals 17 and the stud 19, and carries a stud 25 that engages the contact strip 14, Fig. 3, to separate it from contact strip 15 when the instrument assembly is plugged into the socket. The auxiliary base 22 also carries a centrally located screw 26 for engagement by a threaded bushing 27 on the rear wall of the socket section 2 to clamp the instrument in place within the socket.

Figure 1:
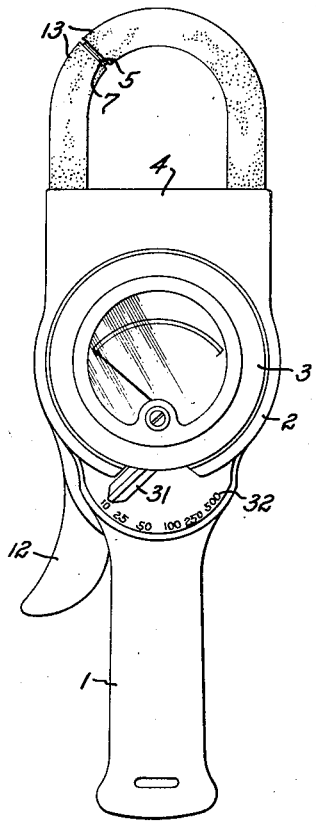
Figure 2:
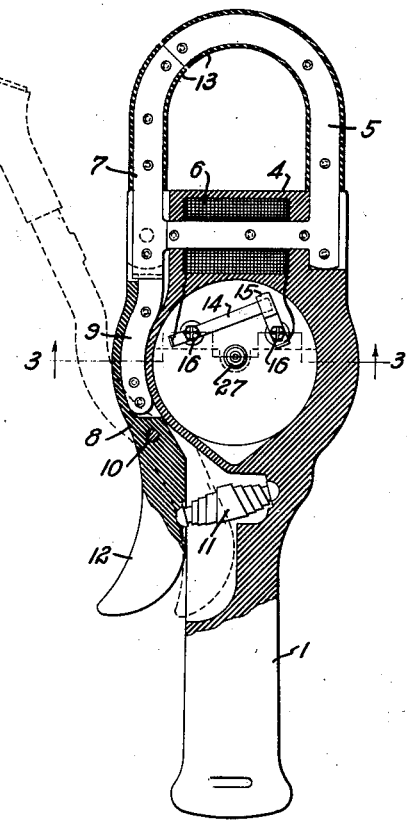
Fig. 2 is a similar elevation, but with the instrument removed from the handle and parts shown in section.

The auxiliary base 22 has a semi-circular flange at the upper part of its front face to space the auxiliary base from the instrument case 3, and a semi-circular flange at the lower part of its rear face to receive a cover plate 22'. The outline of the base 22 is that of a circle with a dependent portion 28 that is shaped to conform to the non-circular socket of the body portion of the handle-transformer assembly. The extension 28 is apertured to provide a bearing for the switch of the range-changing system, and the other bearing comprises a cylindrical recess in the flange of instrument case 3 for receiving the shaft 29 of the switch. A sleeve 30 of insulating material is molded upon the shaft 29 and terminates in a handle 31 that is positioned for ready operation by the thumb of the hand holding the handle 1 of the clamp-on ammeter, Figs. 1 and 2. An arcuate scale 32 of range values is molded into or otherwise marked on the body portion 2 adjacent the path of the lower end of the switch operating handle 31.

The usefulness of a measuring apparatus depends upon the range of values that may be measured and a general purpose instrument is usually of the multi-range type. There is no difficulty in operating range-changing switches of laboratory measuring apparatus but the operator of a clamp-on ammeter will usually have only one hand free to hold the instrument. The location of the switch handle 31 in position for adjustment by the thumb of the hand holding the apparatus is therefore of major importance as the measuring range may be adjusted without removing the apparatus from the cable.

The electrically connected contact arms 33, 34 on the switch shaft 29 travel along a contact strip 35 and spaced contacts 36, respectively, and a resilient index arm 37 engages slots or recesses 38 in the base 22 to facilitate the adjustment of the switch to its several positions. The angular movement of the switch blade is limited by the engagement of a lug 39 of the index arm 37 with the ends of a slot or recess 40 in the base 22.

A plurality of resistances 41, in the form of small "spool" windings, between metal terminal flanges, are mounted on certain of the switch contacts 36 and internally threaded bushings 42 that are molded into the base 22. The contacts 36 and bushings 42 are of identical design, and the resistance spools or conducting strips are connected to these inserts by small screws, see Figs. 4 and 6. The measuring circuit that is shown schematically in Fig. 7 is established by a conducting strip 43 that is secured to the bushing 42 of an end resistor 41 and has an apertured end for fitting upon one of the terminals 17, a conducting strip 44 that is secured to a contact 36 at the opposite side of the auxiliary base 22 and has an apertured end for seating on the stud 19, and an extension 45 of the switch contact 35 that is apertured to fit upon the other terminal 17. The pair of hollow terminals 17 engage the socket terminals 16 to connect the complete instrument and range-change unit to the transformer winding 6, but the input terminals of the instrument per se comprise the stud 19 and one of the terminals 17. The operation of the range-changing system is well known in the art and a detailed description is therefore omitted from this specification.

In accordance with this invention, provision is made for locating the measuring instrument at a point remote from the cable or conductor that is encircled by the split transformer core 5, 7. The extension unit for remote indications of the current flow comprises an instrument socket connected to a plug that may be inserted in the socket of the molded body section 2 when the instrument-range changing assembly is removed. The socket element comprises a box having a cover 46 with a non-circular opening 47 for receiving the instrument-switch unit, and carrying a range scale 32' duplicating the scale 32 on the molded body of the handle-transformer assembly. The base 48 of the box carries contact strips 14', 15' on pin terminals 16' to which the flexible conductors of a cable 49 are connected, and a bushing 27' for engaging the screw 26 of the instrument-switch unit to secure the same within the box. The plug 50 at the other end of cable 49 has a non-circular cross-section for fitting within the socket section of the transformer handle or, when not in use, within the socket element of the extension unit. The upper part of the plug carries hollow terminals 17' similar to the instrument terminals 17, a pin 25' for opening contacts 14, 15 when the plug is inserted in the socket of section 2 of the transformer handle, and a screw 26' for engagement by bushings 27 or 27'.

The socket element of the extension unit may be placed at any convenient point when the cable is so located that it would be difficult or impossible for the operator to read the instrument when positioned in the handle socket. This method of remote indication with a clamp-on ammeter is entirely practical since the range-changing switch is carried by the plug-in ammeter and not by the handle-transformer assembly that is hung upon the cable.

It is to be understood that there is some latitude in the design and construction of the parts of the measuring apparatus and that many changes that may be made in the illustrated embodiment fall within the spirit of our invention as set forth in the following claims.

We claim:

1. In a clamp-on ammeter, a measuring instrument, a transformer core including a stationary section and a pivotally mounted section, a winding on the stationary section of said core, a body of insulating material comprising a handle portion merging into a supporting portion that carries said transformer core and said instrument, and circuit elements including range-changing means connecting said instrument to said winding, said range-changing means including a switch having an operating member positioned for actuation by the thumb of the hand in which the handle is held.

2. In a clamp-on ammeter, a molded body member comprising a handle merging into a socket section surmounted by a top section, a lever pivoted on the socket section and normally positioned within a slot in the edge of the socket section, a transformer core including a stationary section supported by the top section of the body portion and a section mounted on the lever, a winding on the stationary section of said core, an instrument carried by said socket section, and circuit elements connecting said winding to said instrument.

3. In a clamp-on ammeter, the invention as claimed in claim 2, wherein said lever includes a trigger extending along the upper portion of the handle in position to be encircled by the hand in which the handle is held.

4. In a clamp-on ammeter, a body member comprising a handle and a section for supporting an instrument, a transformer mounted on said body portion and including a stationary and a movable core section, a winding on the stationary section of the transformer core, an instrument carried by said instrument-supporting section of said body member, and circuit elements including range-changing means connecting said winding to said instrument; said range-changing means including a switch having an operating member positioned for actuation by the thumb of the hand in which the handle is held.

5. In a clamp-on ammeter, a body member comprising a handle and an instrument-supporting section, a transformer core supported on said body member and comprising a stationary core member and a pivoted core member, a winding on one of said core members, contacts carried by said instrument-supporting section and connected to said winding, and measuring instrument means adapted to be mounted on and removed from said instrument-supporting section of the body member, said measuring instrument means having terminals for engagement with said contacts when said measuring instrument means is mounted on said instrument-supporting section of said body member.

6. In a clamp-on ammeter, a body portion of insulating material supporting a split transformer core and a handle merging into a socket section, a winding on the transformer core, terminals for said winding carried by said socket section, and measuring apparatus including plug-in means adapted to be inserted in and removed from said socket section, said plug-in means having terminals for engagement with said transfomer winding terminals when said measuring apparatus is inserted into said socket section.

7. In a clamp-on ammeter, a body portion of insulating material supporting a split transformer core and a handle merging into a socket section, a winding on the transformer core, terminals for said winding carried by said socket section, and measuring apparatus adapted to be inserted in and removed from said socket section, said measuring apparatus having terminals for engagement with said transformer winding terminals when said measuring apparatus is inserted into said socket section.

8. In a clamp-on ammeter, a body portion of insulating material supporting a split transformer core and a handle merging into a socket section, a winding on the transformer core, terminals for said winding carried by said socket section, and measuring apparatus adapted to be connected to said transformer winding terminals; said measuring apparatus comprising a plug element to be inserted in said socket section and having terminals for engagement with the transformer winding terminals, a socket member having terminals connected by a cable with the terminals of said plug element, and a measuring instrument means positioned in said socket member and having terminals engaging the terminals of said socket member.

9. In a clamp-on ammeter, a molded body member of insulating material supporting a split transformer core and including a handle merging into a socket section, a winding on the transformer core, terminals for said winding carried by the socket section, resilient contact strips on said terminals tending to short-circuit said winding, measuring apparatus including an element with terminals for engagement with said winding terminals when plugged into said socket section, and a pin on said element for separating said contact strips when plugged into said socket section.

10. In a clamp-on ammeter, the invention as claimed in claim 9, wherein said measuring apparatus comprises an ammeter constituting said element having terminals for engagement with said winding terminals.

11. In a clamp-on ammeter, the invention as claimed in claim 9, wherein said measuring apparatus comprises an extension unit having a plug constituting said element, a socket member having terminals connected by a cable with the terminals of said element, and an ammeter positioned in said socket member and having terminals engaging the terminals of the socket member.

12. In a clamp-on ammeter, the combination with a body member carrying a split transformer core and a winding on said core, said body member including a socket carrying a pair of terminals connected to the ends of said winding, of a unitary ammeter and range-changing switch assembly adapted to be plugged into said socket; said assembly including an ammeter within a case, a switch base mounted on said ammeter case, range-adjusting resistors mounted on said base, switch contacts on said base and connected to said resistors, and angularly adjustable switch blade means for engaging said contacts.

13. In a multi-range ammeter, the combination with an ammeter within a case and three terminal members carried by and projecting from the back of said case, said ammeter being connected between a pair of said terminal members, of range-changing means for said ammeter; said range-changing means comprising a base and means for mounting the same on the back of said case, a plurality of resistors on said base and serially connected between said pair of terminal members, switch contacts on said base and connected to said resistors, and switch means adjustable to connect said third terminal member to the desired one of said switch contacts to determine the measuring range, the third terminal member and one terminal member of said pair comprising input terminals for said multi-range ammeter.

14. In a multi-range ammeter, the invention as recited in claim 13, wherein said base includes a flange projecting therefrom to engage the back of said case, and thereby space said base from the case, said switch contacts are at the forward face of said base, and said switch means includes blade means pivotally supported on said base and said case for movement in the space between said base and case.

15. In a multi-range ammeter, the invention as recited in claim 13 wherein said resistors are mounted on the rearward face of said base, and said base has a flange engaging the back of said case to provide a space between said case and said base in which said switch means is positioned; in combination with a cover plate secured to said base to extend over said resistors.

ALFRED H. WOLFERZ.
PAUL P. HUBER.